Figure 1:
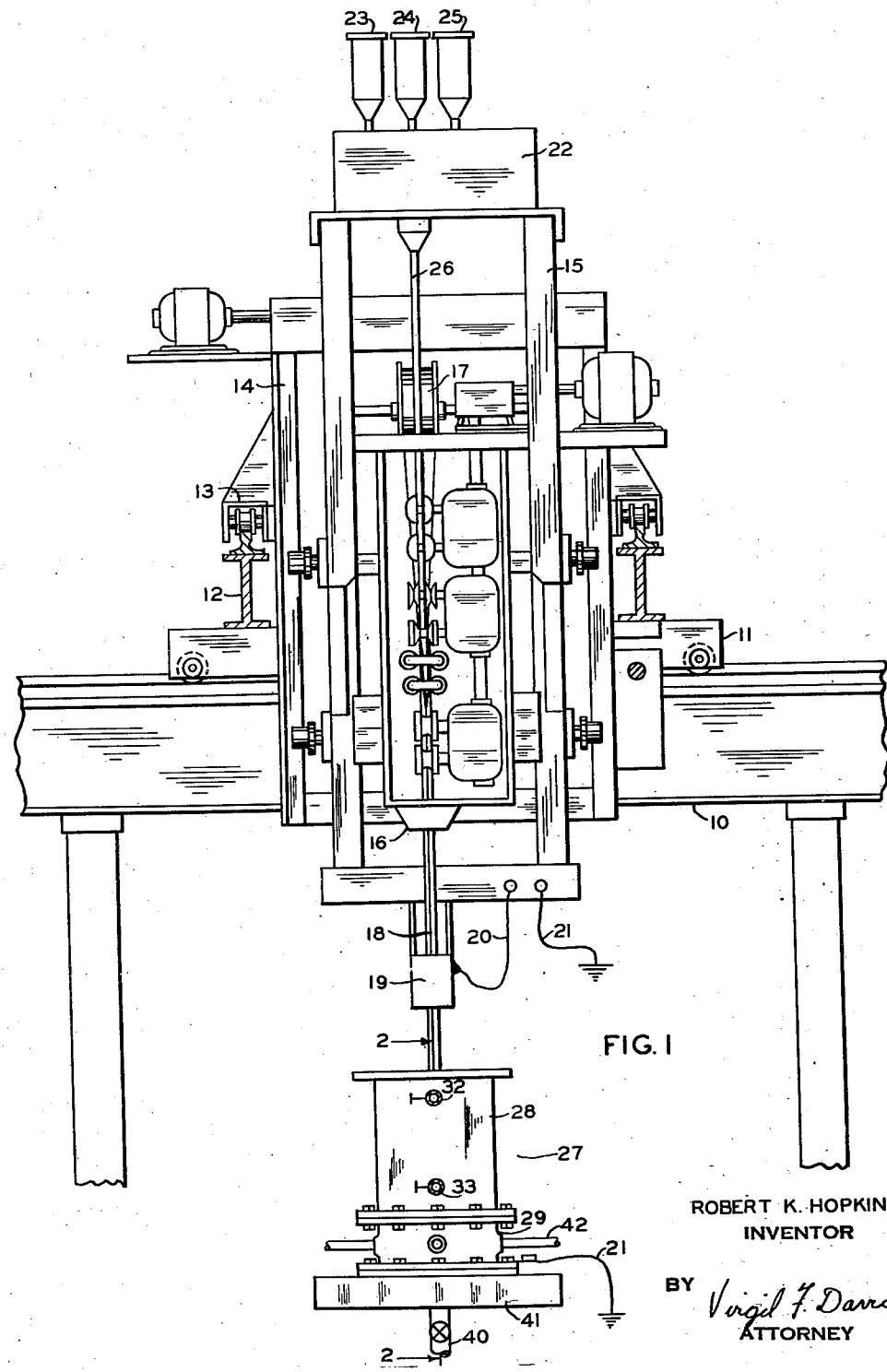

March 13, 1945.   R. K. HOPKINS   2,371,294
APPARATUS FOR THE MANUFACTURE OF ALLOY BODIES
Filed April 7, 1942   2 Sheets-Sheet 2

ROBERT K. HOPKINS
INVENTOR

BY *Virgil F. Davies*
ATTORNEY

Patented Mar. 13, 1945

2,371,294

UNITED STATES PATENT OFFICE 2,371,294

APPARATUS FOR THE MANUFACTURE OF ALLOY BODIES

Robert K. Hopkins, New York, N. Y., assignor to The M. W. Kellogg Company, New York, N. Y., a corporation of Delaware Application April 7, 1942, Serial No. 437,988

8 Claims. (Cl. 22—144)

This invention relates to apparatus for making consistently uniform semi-finished alloy bodies from raw materials in a single continuous operation in which the necessary heat is supplied by the discharge of electric current through a gap, or gaps, submerged beneath a blanket of protective flux and the alloy metal is progressively solidified during the manufacture of the semi-finished alloy body. This invention is in the nature of an improvement on the apparatus disclosed in my prior Patent No. 2,191,479 of February 27, 1940.

In my prior patent the alloy producing operation is begun by discharging electric current through a gap created between the end of the metal electrode and a metal body in the bottom of the mold. This metal body, or bottom starting plug, is usually coextensive with the mold bottom and forms a false bottom for the mold. The bottom plug is of a thickness sufficient to assure that in the initial stages of the operation neither the current discharge nor molten metal contacts or approaches the mold bottom. In this manner destruction of the mold bottom, or fusion of the alloy body formed during the operation to the mold bottom, is effectively prevented. In the early stages of the operation a depth of metal of the bottom plug is fused and intermingled with the alloy metal produced so that the bottom plug becomes an integral part of the alloy body produced. The bottom plug therefore is usually made of metal of the same character and analysis as the desired alloy body so that a maximum yield of finished products of the required character and analysis can be obtained from the alloy body. Since the bottom plug must contact the mold sufficiently well to conduct the current required for the discharge, machining is required to produce it. The energy expended in fusing the metal of the plug furthermore does not produce new metal and from this viewpoint can be considered as wasted.

The bottom plug, therefore, while it admirably serves its intended purpose renders the operation more costly and less efficient than it need be. This is especially true when the alloy bodies produced are small in size and the bottom plug is a substantial portion of the alloy body.

I have found that the bottom starting plug may be dispensed with and the alloy producing operation started directly on a properly constructed mold bottom.

It is, therefore, the primary object of this invention to provide a novel apparatus for manufacturing consistently uniform semi-finished alloy bodies from raw materials by the discharge of electric current through a gap submerged beneath a blanket of protective flux, in which, the operation is begun on the mold bottom without destroying the same or fusing the alloy metal produced thereto.

It is a further object of this invention to provide a mold bottom of novel construction in which metals can be manufactured by the discharge of electric current through a gap, which includes wall defining means having a depression therein that is filled with molten metal during operations, the wall defining means being capable of resisting exposure to the electric current discharge without substantial destruction, at least the portion of the wall defining means forming the bottom of the depression being made of electrically conductive material.

Figure 2:
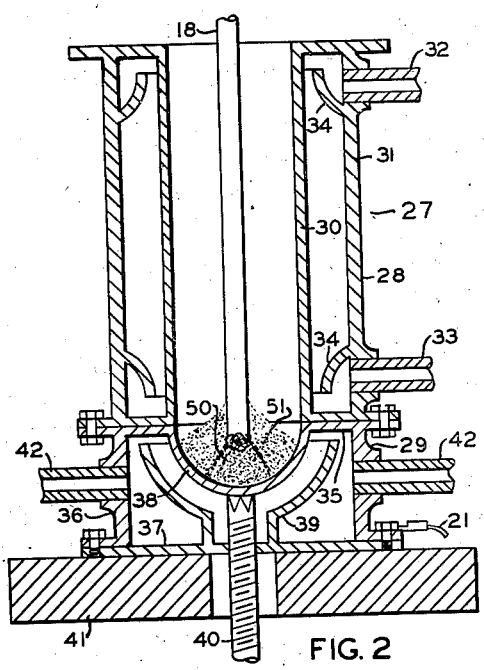

The further objects and advantages of the invention will be apparent to those skilled in the art from the following description, taken with the accompanying drawings, in which, Fig. 1 is a front view of apparatus, including the novel mold bottom, used in carrying out in practice the novel method of the invention, Fig. 2 is a sectional view taken on line 2—2 of Fig. 1, and Figs. 3, 4, and 5 are views similar to Fig. 2 showing modifications.

In my prior Patent No. 2,191,479, the alloy body of predetermined analysis is produced by subjecting raw materials containing the constituents of the desired alloy to the action of electric current discharged through a gap maintained beneath a protective depth of flux. The raw materials are supplied to the electric current discharge in independently controlled streams at rates adjusted to constantly supply the constituents in the proportions required to produce the desired analysis. The raw materials are converted into the desired alloy substantially as supplied. A raw material, containing one or more of the constituents, is formed into and supplied as a hollow member which forms a terminus for the gap through which the electric current is discharged. Some or all of the remainder of the raw materials may be supplied in particle form through the hollow electrode to the gap; some of the raw materials may also be supplied in continuous solid form, as a wire or a bar, separately from the hollow electrode; electric current may also be discharged from the ends of the raw materials in the continuous solid form.

The operation is carried out in a mold which is provided with controllable cooling means. The heat input through the electric current discharge, the quantity of materials fused, and the heat removed through the mold are controlled as required to produce an alloy body of uniform desired analysis and uniform desired characteristics. The conditions just mentioned above are so controlled that the flux blanket is maintained at the required degree of superheat, the body of superheated molten metal is maintained large enough to assure proper refining and thorough intermingling of molten metal, and the molten metal is solidified progressively during the metal producing operation. The operation is begun with an alloy plug of the same analysis and characteristics as the desired alloy body in the bottom of the mold. The alloy plug is partly fused and becomes an integral part of the desired alloy body but it protects the mold bottom and prevents contamination of the metal produced. For a more detailed description of the method, reference may be had to my prior patent.

In the present invention, the method of my prior Patent No. 2,191,479 is practiced with the noteworthy exception, however, that the operation is commenced on the mold bottom without the use of the alloy plug so that the final alloy body is made up entirely of alloy metal produced during the operation.

The operation is initiated by placing a quantity of raw materials in particle, or other subdivided form, on the mold bottom and, after the required quantity of protective flux is placed in the mold, the discharge of electric current is begun through a gap formed between the end of the hollow electrode and the quantity of raw materials. The quantity of raw materials placed in the mold bottom must be such that substantially all of it is fused during the very early stages of the operation and thoroughly intermingled with the other quantities of raw materials supplied during these early stages to provide molten metal between the mold bottom and the electric discharge of sufficient depth to protect the mold bottom from protracted exposure to the electric current discharge.

Preferably in the quantity of raw materials initially placed on the mold bottom is included each of the raw materials used in the production of the alloy body; also, these raw materials are thoroughly intermixed and are present in the proportions required for the predetermined analysis. Satisfactory results may also be obtained by omitting one or more of the raw materials from the raw materials initially placed in the mold bottom and compensating for this by supplying the omitted raw material, or materials, at greater than normal rates during the early stages of the operation. While this is possible, it is not recommended as variations in analysis will result unless the compensation is accurately performed.

To assure satisfactory operation without injury to the mold bottom it is at present preferred to remove heat through the wall of the mold bottom, and this at a high rate. Thus, the wall of the mold is preferably formed of a metal of high heat conductivity, such as copper or brass, and a controlled stream of cooling medium is jetted against it. It has been found that satisfactory results may also be obtained if the wall of the mold bottom is made of a block of graphite or some such conductive material that is highly heat resistant. When a graphite bottom is used it is generally not necessary to cool it as sufficient cooling is obtained through the mold walls and the inherent heat absorbing capacity of the graphite.

It has further been found that satisfactory results may be obtained if the mold bottom is made in part of graphite and in part by a highly refractory material such as zirconium oxide, etc.; the graphite should form the lowermost part of the mold bottom. It has also been found that satisfactory results may be obtained by forming the upper portion of the wall of the mold bottom out of a refractory material such as zirconium oxide and the lower portion out of a metal of high heat conductivity, such as copper or brass, and jetting a controlled stream of cooling medium against it to cool it.

The apparatus employed, aside from the mold, is substantially the same as that disclosed and described in my prior Patent No. 2,191,479 and, hence, a brief description of it will suffice here.

The apparatus includes a support 10 upon which is mounted for movement thereon a truck 11. A bridge 12 is carried on truck 11 and it in turn mounts a truck 13 for movement thereon. Truck 13 carries a vertical frame 14 fixed thereto. A frame 15 is mounted for vertical movement relative to frame 14. Frame 15 carries electrode forming and feeding mechanism 16 which forms strip 17 into hollow electrode 18 and feeds it into the mold. Mechanism 16 is driven by a variable speed motor which may be arc controlled, as is common in the electric furnace art, to form and feed electrode 18 as required to maintain an arc discharge of constant characteristics from its end; also the motor may be run at a constant selected speed and the current of the discharge controlled to fuse the electrode at the rate fed. Electrode 18 passes through a contact device 19 and is connected to one side of the electric current supply through cable 20. The other side of the electric current supply may be grounded through cable 21 or connected by a cable directly to the mold.

Frame 15 also carries a plurality of metering devices in housing 22. The metering devices are arranged to receive granular raw materials from a hopper such as hoppers 23, 24, and 25 and feed them at constant but adjustable rates to a tube 26 that leads into the inside of hollow electrode 18. Electrode 18 feeds into a mold 27 wherein the metal producing operation takes place.

Mold 27 includes a body portion 28 and a bottom portion 29. Body portion 28 includes a mold defining wall 30 and an outside wall 31. A cooling medium, usually water, enters the jacket formed between walls 30 and 31 through valved lines 32, and exits through valved lines 33, only one of each being shown. To assure proper distribution of the cooling medium deflectors 34 are provided, these deflectors also assure the cooling medium reaching the very top and very bottom of wall 30. The mold cavity may be of any desired shape and may be made out of any suitable material. When high melting point alloys such as alloys containing iron in major proportions are produced, I prefer to make wall 30 out of a material of high heat conductivity such as copper or brass. When alloys of lower melting point are produced metals of lower conductivity and even refractory materials may be employed.

Body portion 28 is supported on bottom portion 29 and the two are removably held together by bolts or the like. The bottom portion 29 shown in Fig. 2 includes a top wall 35, a side wall 36 and a bottom wall 37. Walls 35 and 36 may be cast as a unit or united as by welding or brazing. Wall 35, when high melting point alloys are produced, is also made of a metal of high heat conductivity such as copper or brass and includes a central depression 38 in which the operation is initiated. Depression 38 is preferably hemispherical although depressions approximating a cone may also successfully be used. Wall 37 is removably united to wall 36 as by bolts and carries a deflector member 39 which approximates depression 38 in shape.

In the center of wall 37 is a threaded hole through which extends the threaded end of valved line 40 which serves as the inlet for the heat exchange medium. Line 40 may, as shown, extend through the member 41 upon which the mold is supported. By means of the threaded connection the end of line 40 is adjustable relative to depression 38 so that by means of its adjustment the flow of the heat exchange medium may be controlled. Preferably the end of line 40 is notched and adjusted to contact wtih depression 38 so that a desired flow may be obtained. Line 40 by contacting depression 38 serves to reenforce it during operations. The heat exchange medium leaves through lines 42. The mold is placed in the electric circuit by a cable 21, connected to mold bottom 29, which is either grounded or connected directly to the current source as stated above.

Figure 3:
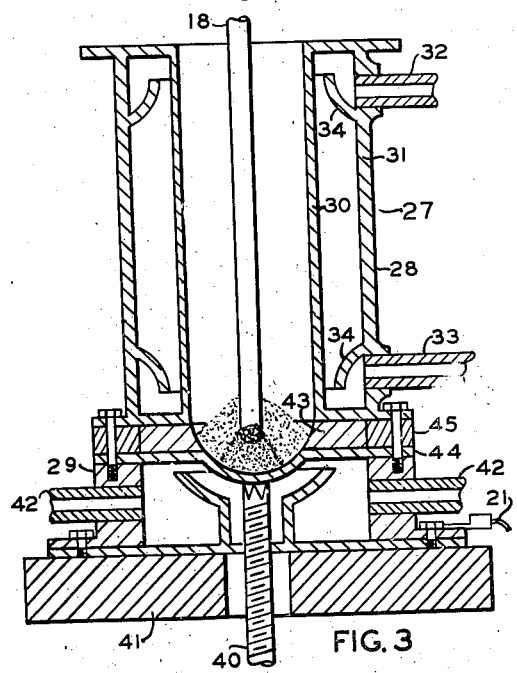

Mold bottom 29 of Fig. 3 is much like that of Fig. 2 except that the central depression is formed in part by a block of refractory material 43 and in part by a metal wall 44, preferably of copper or brass, corresponding to wall 35. Zirconium oxide is at present preferred as the material of block 43. Block 43 fits in a recess formed by the bottom of portion 28, annular metal member 45 and wall 44. Block 43 is spaced from the bottom of portion 28 so that it is not subjected to destructive stresses.

Figure 4:
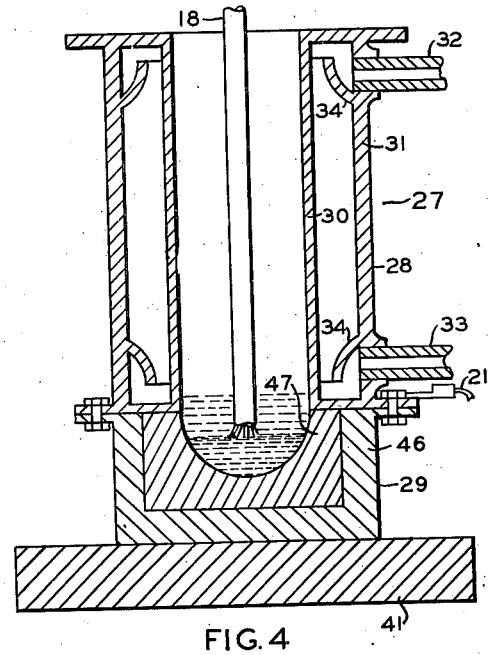
Figure 5:
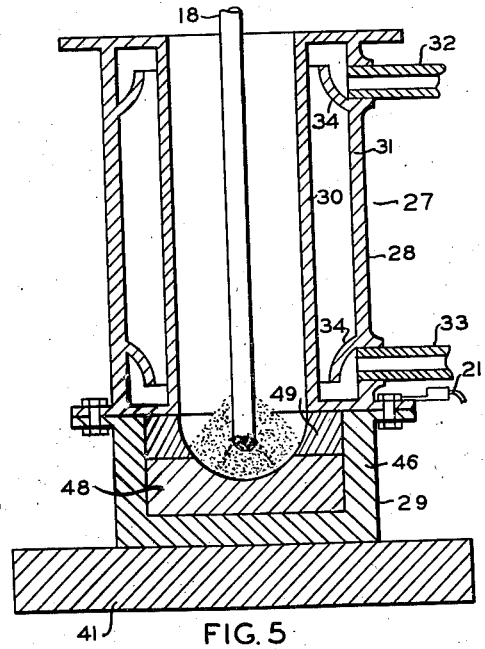

Mold bottom 29 of Fig. 4 includes a cup-like member 46 which houses a block of conductive heat refractory material 47 having a hemispherical recess therein, graphite is the present preferred material for block 47. The mold bottom of Fig. 5 is similar to that of Fig. 4 except that the semi-cylindrical recess is formed in part by graphite block 48 and in part by block 49 of zirconium oxide. No means is provided to remove heat from the mold bottoms of Figs. 4 and 5 as their recesses are defined by materials that are highly resistant and sufficient heat is removed by the heat exchange medium circulated through body portion 28 and the heat absorbing capacity of the materials defining the recesses.

After the various apparatus settings, rates of feed, etc., have been determined and the necessary settings made as explained in my prior patent, a quantity of raw materials 50 is placed in the recess in the mold bottom 29. Preferably this quantity of raw materials includes some of all the raw materials used and these in the proportions required to produce the desired analysis. The raw materials are in the subdivided form and preferably thoroughly intermixed. Less than all of the raw materials may be present in raw materials 50 but if such is the case it will be necessary to feed the omitted raw material, or materials, at a sufficiently increased rate in the early stages of the operation to compensate for the original omission. A wad of steel wool, or other arc starter, is placed in the bottom of electrode 18 and the latter lowered into mold 27 until the arc starter is in contact with raw materials 50. The required quantity of protective flux 51 is then placed in the mold space, the circulation of the heat exchange medium is begun and the apparatus set into operation.

The initial surge of current destroys the arc starter to provide a discharge gap between the end of electrode 18 and raw materials 50. The current discharged through the gap fuses metal of electrode 18, raw materials supplied through electrode 18 and raw materials 50 to form a pool of liquid metal which quickly covers the bottom of the recess and serves to protect it from prolonged exposure to the electric current discharge. The quantity of raw materials 50 employed should be such that it will all be fused in the initial stages of the operation and yet provide a sufficient depth of molten metal to afford substantial protection for the material defining the recess.

The operation is carried forward to completion in the manner disclosed in my prior patent.

I claim:

1. An open ended mold, a mold bottom upon which said mold is positioned to close the bottom end thereof, said mold bottom including a wall adapted to contact the molten metal deposited in said mold, said wall having a depression therein, at least the lower portion of said depression being formed of metal of high heat conductivity, and a member adjustably positionable relative to the bottom of said depression for delivering a heat exchange medium against the metal portion of said wall.

2. An open ended mold, a mold bottom upon which said mold is positioned to close the bottom end thereof, said mold bottom including a wall adapted to contact the molten metal deposited in said mold, said wall having a depression therein, at least the lower portion of said depression being formed of metal of high heat conductivity, and a tubular member having a castellated end adjustably positionable relative to the bottom of said depression for delivering a heat exchange medium against the metal portion of said wall.

3. An open ended mold, a mold bottom upon which said mold is positioned to close the bottom end thereof, said mold bottom including a wall adapted to contact the molten metal deposited in said mold, said wall having a depression therein, at least the lower portion of said depression being formed of metal of high heat conductivity, a tubular member having a castellated end adjustably positionable relative to the bottom of said depression for delivering a heat exchange medium against the metal portion of said wall, and deflector means spaced from the metal portion of said wall adapted to direct the heat exchange medium into contact with the depressed part of said metal portion of said wall.

4. An open ended mold, a mold bottom upon which said mold is positioned to close the bottom end thereof, said mold bottom including a chamber formed by top, side and bottom members, the top member being made of metal of high heat conductivity and having a depression therein, said top member being adapted to contact the molten metal deposited in the mold, a hole in the bottom member in line with the center of said depression, a tubular member through which a heat exchange medium is adapted to be introduced into said chamber extending through said hole and adjustably positionable relative the bottom of said depression, deflector means concentric with said hole having a portion thereof approximating said depression in shape and spaced therefrom, and means in the side member for outlet of the heat exchange medium from said chamber.

5. An open ended mold, a mold bottom upon which said mold is positioned to close the bottom end thereof, said mold bottom including a chamber formed by top, side and bottom members, the top member being made of metal of high heat conductivity and having a depression therein, said top member being adapted to contact the molten metal deposited in the mold, a hole in the bottom member in line with the center of said depression, a tubular member through which a heat exchange medium is adapted to be introduced into said chamber extending through said hole, said tubular member having a castellated end adjustably positionable relative to said hole and adapted to bear against the bottom of said depression, deflector means concentric with said hole having an upper portion approximating said depression in shape and spaced therefrom, and a plurality of heat exchange medium outlets in the side member substantially equi-spaced around said deflector means.

6. An open ended mold, a mold bottom upon which said mold is positioned to close the bottom end thereof, said mold bottom including a chamber formed by top, bottom and side members, the top member being made of metal of high heat conductivity and having a depression therein adapted to be filled by the molten metal deposited in the mold, means for introducing a heat exchange medium into contact with said depression and distributing it substantially uniformly thereover, means for removing the heat exchange medium through the side member, a member on said top member aligned with said side member and forming an extension thereof, and a block of highly refractory material in the recess formed by said top member and said member aligned with said side member, said block of highly refractory material having a hole therein forming a continuation of said depression.

7. An open ended mold, a mold bottom upon which said mold is positioned to close the bottom end thereof, said mold bottom including a chamber formed by top, bottom and side members, the top member being made of a metal of high heat conductivity and having a depression therein adapted to be filled by the molten metal deposited in the mold, means for introducing a heat exchange medium into contact with said depression, means for removing the heat exchange medium through the side member, a member aligned with said side member and extending above said top member, and a block of highly refractory material in the recess formed by said top member and said member aligned with said side member, said block of highly refractory material having a hole therein forming a continuation of said depression, said block of highly refractory material being somewhat less in thickness than the depth of said recess, the bottom of said mold being adapted to rest on said aligned member whereby said block of highly refractory material is not subject to crushing stresses.

8. A mold adapted for use in operations in which molten metal is produced by subjecting raw materials to the action of the discharge of electric current through a gap, said mold comprising an open ended body portion and a body portion closing one end of said body portion, said bottom portion including a cup-like metal member adapted to support said body portion, and wall defining means adapted to close the bottom end of said body portion, said wall defining means including a lower portion made of conductive material and an upper portion made of highly refractory material, a depression in said wall defining means including both of said portions, and means connecting said conductive portion in the circuit of the electric current discharged through the gap.

ROBERT K. HOPKINS.